US012756850B2

(12) United States Patent
Wang

(10) Patent No.: US 12,756,850 B2
(45) Date of Patent: Oct. 6, 2026

(54) CHROMA BLOCK DECODING METHOD AND APPARATUS, AND COMPUTER-READABLE MEDIUM AND ELECTRONIC DEVICE

(71) Applicant: Tencent Technology (Shenzhen) Company Limited, Guangdong (CN)

(72) Inventor: Yingbin Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/948,961

(22) Filed: Nov. 15, 2024

(65) Prior Publication Data

US 2025/0071306 A1 Feb. 27, 2025

Related U.S. Application Data

(63) Continuation of application No. PCT/CN2023/106388, filed on Jul. 7, 2023.

(30) Foreign Application Priority Data

Nov. 25, 2022 (CN) ........................ 202211494687.X

(51) Int. Cl.
*H04N 19/44* (2014.01)
*H04N 19/119* (2014.01)
(Continued)

(52) U.S. Cl.
CPC ........... *H04N 19/44* (2014.11); *H04N 19/119* (2014.11); *H04N 19/176* (2014.11); *H04N 19/186* (2014.11)

(58) Field of Classification Search
CPC .... H04N 19/44; H04N 19/119; H04N 19/176; H04N 19/186
(Continued)

(56) References Cited

U.S. PATENT DOCUMENTS

2016/0227245 A1* 8/2016 Liu ...................... H04N 19/176
2019/0020878 A1 1/2019 Xu et al.
2024/0022739 A1* 1/2024 Li ........................ H04N 19/186

FOREIGN PATENT DOCUMENTS

CN 110087089 A 8/2019
CN 111492659 A 8/2020
(Continued)

OTHER PUBLICATIONS

ISR for International Application No. PCT/CN2023/106388 dated Oct. 2, 2023.

(Continued)

*Primary Examiner* — Justin W Rider
(74) *Attorney, Agent, or Firm* — Sughrue Mion, PLLC

(57) ABSTRACT

A video decoding method, includes: partitioning a chroma block into at least one chroma sub-block based on determining a first block vector (BV) of the chroma block is derived from a second BV of a luma block; acquiring a third BV of a first luma sub-block corresponding to the at least one chroma sub-block; mapping the third BV to a fourth BV of the at least one chroma sub-block according to a chroma scale factor of video to be decoded; and decoding the chroma block according to the fourth BV to obtain a reconstructed block corresponding to the chroma block.

18 Claims, 9 Drawing Sheets

(51) Int. Cl.
*H04N 19/176* (2014.01)
*H04N 19/186* (2014.01)

(58) Field of Classification Search
USPC .................................................... 375/240.25
See application file for complete search history.

(56) References Cited

FOREIGN PATENT DOCUMENTS

| | | | | | |
|---|---|---|---|---|---|
| CN | 112823520 | A | | 5/2021 | |
| CN | 113924780 | A | | 1/2022 | |
| EP | 3503550 | A1 | * | 6/2019 | ....... H04N 21/23424 |
| JP | 2025060932 | A | * | 4/2025 | ........... H04N 19/198 |

OTHER PUBLICATIONS

Written Opinion for International Application No. PCT/CN2023/106388 dated Oct. 2, 2023.

* cited by examiner

CHROMA BLOCK DECODING METHOD AND APPARATUS, AND COMPUTER-READABLE MEDIUM AND ELECTRONIC DEVICE

CROSS-REFERENCE TO RELATED APPLICATIONS

This application is a continuation application of International Application No. PCT/CN2023/106388 filed on Jul. 7, 2023, which claims priority to Chinese Patent Application No. 202211494687.X, filed with the China National Intellectual Property Administration on Nov. 25, 2022, the disclosures of each being incorporated by reference herein in their entireties.

FIELD

The disclosure relates to the field of computer and communication technologies, and in particular to a video coding and decoding method and apparatus, a computer-readable medium, and an electronic device.

BACKGROUND

In relevant audio and video coding and decoding standards, chroma blocks and luma blocks may be coded separately. Such methods may affect coding performance and may cause a loss of information.

SUMMARY

Provided are a video coding and decoding method and apparatus, a computer-readable medium, and an electronic device, capable of deriving a block vector (BV) of a chroma block according to a BV of a luma block.

According to some embodiments, a video decoding method, includes: partitioning a chroma block into at least one chroma sub-block based on determining a first block vector (BV) of the chroma block is derived from a second BV of a luma block; acquiring a third BV of a first luma sub-block corresponding to the at least one chroma sub-block; mapping the third BV to a fourth BV of the at least one chroma sub-block according to a chroma scale factor of video to be decoded; and decoding the chroma block according to the fourth BV to obtain a reconstructed block corresponding to the chroma block.

According to some embodiments, a video decoding apparatus, includes: at least one memory configured to store computer program code; and at least one processor configured to read the program code and operate as instructed by the program code, the program code including: partitioning code configured to cause at least one of the at least one processor to partition a chroma block into at least one chroma sub-block, based on determining a first block vector (BV) of the chroma block is derived from a second BV of a luma block; acquisition code configured to cause at least one of the at least one processor to acquire a third BV of a first luma sub-block corresponding to the at least one chroma sub-block; mapping code configured to cause at least one of the at least one processor to map the third BV to a fourth BV of the at least one chroma sub-block according to a chroma scale factor of video; and decoding code configured to cause at least one of the at least one processor to decode the chroma block according to the fourth BV to obtain a reconstructed block corresponding to the chroma block.

According to some embodiments, a non-transitory computer-readable storage medium, storing computer code which, when executed by at least one processor, causes the at least one processor to at least: partition a chroma block into at least one chroma sub-block, based on determining a first block vector (BV) of the chroma block is derived from a second BV of a luma block; acquire a third BV of a first luma sub-block corresponding to the at least one chroma sub-block; map the third BV to a fourth BV of the at least one chroma sub-block according to a chroma scale factor of video; and decode the chroma block according to the fourth BV to obtain a reconstructed block corresponding to the chroma block.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

The block diagrams shown in the accompanying drawings are functional entities and do not necessarily correspond to physically independent entities. For example, the functional entities may be implemented in a software form, or in one or more hardware modules or integrated circuits, or in different networks and/or processor apparatuses and/or microcontroller apparatuses.

The flowcharts shown in the accompanying drawings are exemplary, may be performed in different orders. Additionally, some operations may be further divided, while some operations may be combined or partially combined. Therefore, an actual execution order may change according to an actual case.

"Plurality of" means two or more. "And/or" describes an association relationship of associated objects and represents that three relationships may exist. For example, A and/or B may represent the following three cases: only A exists, both A and B exist, and only B exists. The character "/" may indicate an "or" relationship between the associated objects.

Figure 1:
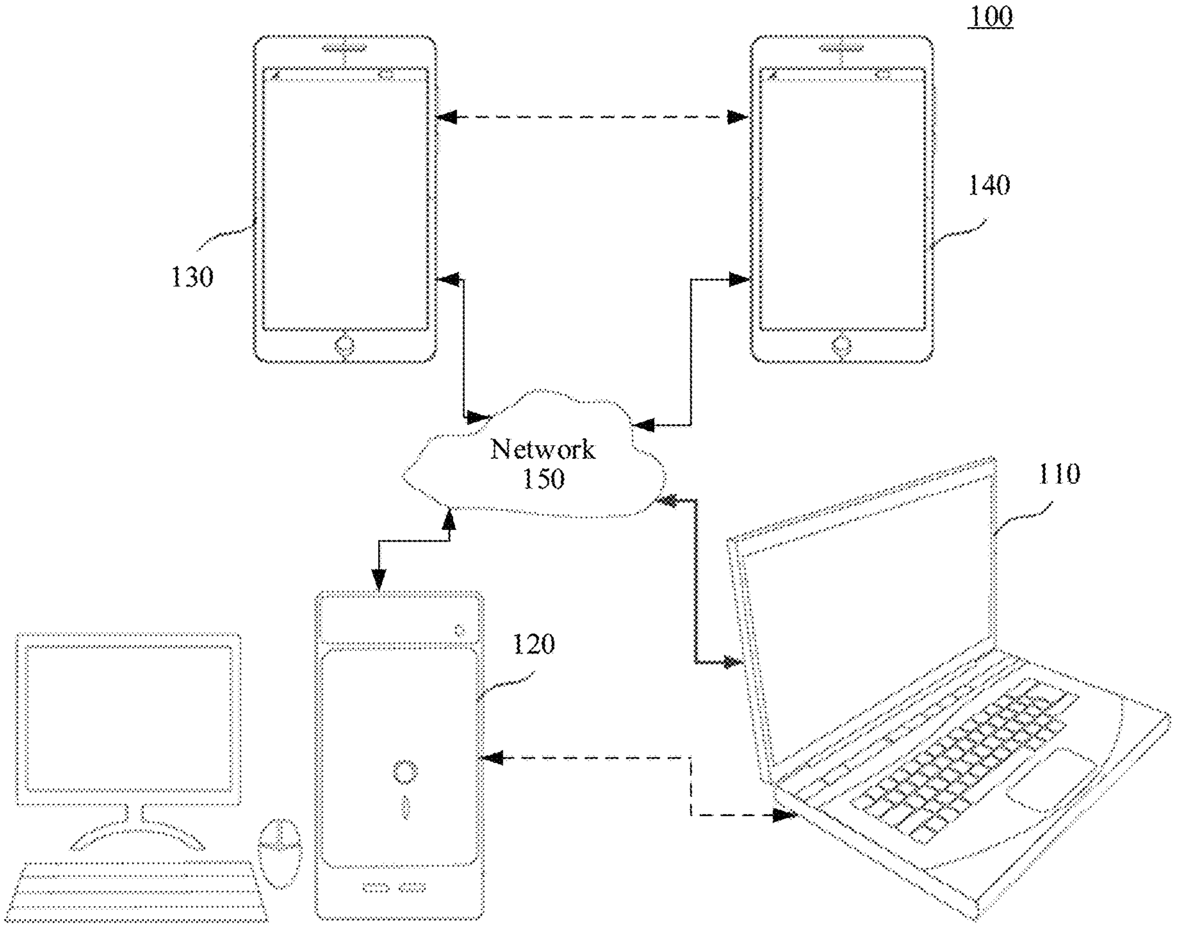
FIG. 1 is a schematic diagram of an exemplary system architecture according to some embodiments.

FIG. 1 is a schematic diagram of an exemplary system architecture according to some embodiments.

As shown in FIG. 1, the system architecture 100 includes a plurality of terminal apparatuses. The terminal apparatuses may communicate with each other by using a network 150, for example. For example, the system architecture 100 may include a first terminal apparatus 110 and a second terminal apparatus 120 interconnected by using a network 150. In some embodiments as illustrated in FIG. 1, for example, the first terminal apparatus 110 and the second terminal apparatus 120 perform one-way data transmission.

For example, the first terminal apparatus 110 may code video data (e.g., a video picture stream captured by the terminal apparatus 110) for transmission to the second terminal apparatus 120 by using the network 150, coded video data is transmitted in the form of one or more coded video bitstreams, and the second terminal apparatus 120 may receive the coded video data from the network 150, decode the coded video data to restore the video data, and display video pictures according to the restored video data.

In some embodiments, the system architecture 100 may include a third terminal apparatus 130 and a fourth terminal apparatus 140 that perform two-way transmission of coded video data. The two-way transmission may occur, for example, during a video conference. For two-way data transmission, either of the third terminal apparatus 130 and the fourth terminal apparatus 140 may code video data (e.g., a video picture stream captured by the terminal apparatus) for transmission to the other of the third terminal apparatus 130 and the fourth terminal apparatus 140 by using the network 150. Either of the third terminal apparatus 130 and the fourth terminal apparatus 140 may further receive coded video data transmitted by the other of the third terminal apparatus 130 and the fourth terminal apparatus 140, may decode the coded video data to restore the video data, and may display video pictures on an accessible display apparatus according to the restored video data.

In some embodiments as illustrated in FIG. 1, for example, the first terminal apparatus 110, the second terminal apparatus 120, the third terminal apparatus 130, and the fourth terminal apparatus 140 may be servers or terminals, but the disclosure is not limited thereto.

The server may be an independent physical server or may be a server cluster or a distributed system formed by a plurality of physical servers, or may be a cloud server that provides a cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, an intelligent voice interaction device, a smartwatch, a smart home appliance, an in-vehicle terminal, an aircraft, or the like, but is not limited thereto.

The network 150 shown in FIG. 1 represents any number of networks that transmit coded video data between the first terminal apparatus 110, the second terminal apparatus 120, the third terminal apparatus 130, and the fourth terminal apparatus 140, including, for example, wired and/or wireless communication networks. The communication network 150 may exchange data in circuit-switched and/or packet-switched channels. The network may include telecommunications networks, local area networks, wide area networks and/or the Internet. An architecture and topology of the network 150 is not limited.

Figure 2:
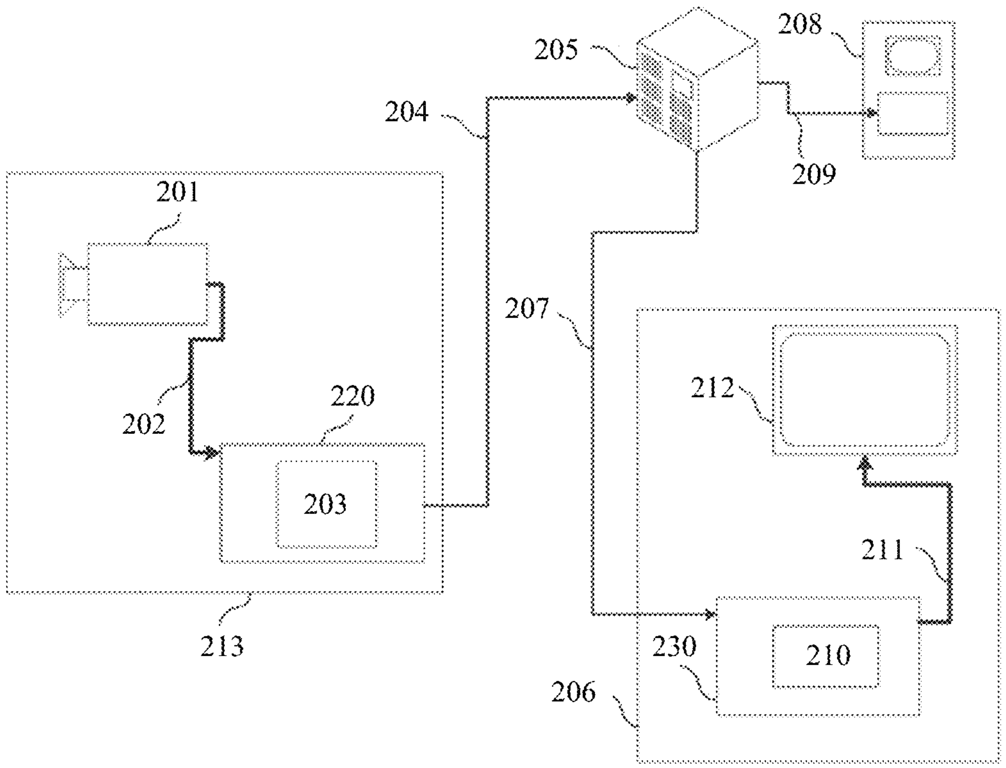
FIG. 2 is a schematic diagram of arrangement modes of a video coding apparatus and a video decoding apparatus in a streaming system.

In some embodiments, FIG. 2 shows arrangement modes of a video coding apparatus and a video decoding apparatus in a streaming environment. Some embodiments may be applicable to other video enabled applications, including, for example, video conferencing, a digital television (TV), and storing of compressed videos on digital media including a compact disc (CD), a digital versatile disc (DVD), a memory stick, and the like.

A streaming system may include a capture subsystem 213. The capture subsystem 213 may include a video source 201 such as a digital camera. The video source creates a video picture stream 202 that is uncompressed. In some embodiments, the video picture stream 202 includes samples that are taken by the digital camera. The video picture stream 202 is depicted as a bold line to emphasize a video picture stream with a high data volume when compared to coded video data 204 (or a coded video bitstream 204). The video picture stream 202 may be processed by an electronic apparatus 220. The electronic apparatus 220 includes a video coding apparatus 203 coupled to the video source 201. The video coding apparatus 203 may include hardware, software, or a combination of software and hardware to enable or implement aspects of the disclosed subject matter as described in more detail below. The coded video data 204 (or the coded video bitstream 204) is depicted as a thin line to emphasize the coded video data 204 (or the coded video bitstream 204) with a lower data volume when compared to the video picture stream 202, which may be stored on a streaming server 205 for future use. One or more streaming client subsystems, such as a client subsystem 206 and a client subsystem 208 in FIG. 2, may access the streaming server 205 to retrieve a copy 207 and a copy 209 of the coded video data 204. The client subsystem 206 may include, for example, a video decoding apparatus 210 in an electronic apparatus 230. The video decoding apparatus 210 decodes the incoming copy 207 of the coded video data and generates an output video picture stream 211 that may be rendered on a display 212 (e.g., display screen) or another rendering apparatus. In some streaming systems, the coded video data 204, video data 207, and video data 209 (e.g., video bitstreams) may be coded according to certain video coding/compression standards.

The electronic apparatus 220 and the electronic apparatus 230 may include other components. For example, the electronic apparatus 220 may include a video decoding apparatus, and the electronic apparatus 230 may further include a video coding apparatus.

In some embodiments, by taking international video coding standards such as high efficiency video coding (HEVC) and versatile video coding (VVC) and the Chinese national video coding/encoding standard such as an audio video coding standard (AVS) as examples, when a video image frame is inputted, the video image frame is partitioned into a plurality of non-overlapping processing units according to a block size, and a similar compression operation is performed on each processing unit. The processing unit is referred to as a coding tree unit (CTU) or a largest coding unit (LCU). The CTU may be further partitioned into one or more basic coding units (CU). The CU may be a most basic element in a coding phase.

In some embodiments, the processing unit may also be referred to as a tile, which is a rectangular region of a multimedia data frame that may be independently decoded and coded. In the AV1 standard, the tile may be further partitioned into one or more superblocks (SB). The SB is a start point of block partition and may be further partitioned into a plurality of sub-blocks. The superblock may be further partitioned into one or more blocks. Each block may be a most basic element in a coding phase. In some embodiments, one SB may include a plurality of Bs.

The above partition mode of the video frame image may be referred to as a block partition structure. Some concepts in the coding process are described below:

Predictive coding: The predictive coding includes modes such as intra prediction and inter prediction. After an original video signal is predicted by using a selected reconstructed video signal, a residual video signal is obtained. A coding end may be configured to select a predictive coding mode for a current CU (or coding block) and inform a decoding end. The intra prediction means that a predicted signal comes from a region that has been coded and reconstructed in a same image. The inter prediction means that the predicted signal comes from a coded image (referred to as a reference image) that is different from a current image.

Transform & quantization: Transform operations such as discrete Fourier transform (DFT) and discrete cosine transform (DCT) are performed on a residual video signal to convert the signal into a transform domain, which is referred to as a transform coefficient. A lossy quantization operation is further performed on the transform coefficient, which loses an amount of information, so that the quantized signal facilitates compressed expression. In some video coding standards, more than one transform mode may be selected. Therefore, the coding end may be configured to select one transform mode for the current CU (or coding block) and inform the decoding end. Fineness of the quantization may be determined by a quantization parameter (QP). A larger QP indicates that coefficients with a larger value range are to be quantized into a same output, which may bring greater distortion and a lower bit rate. On the contrary, a smaller QP indicates that coefficients within a smaller value range are to be quantized into a same output, which may bring less distortion and correspond to a higher bit rate.

Entropy coding or statistical coding: Statistical compression coding is performed on the quantized signal in the transform domain according to a frequency of occurrence of each value, and a binarized (0 or 1) compressed bitstream is output. Entropy coding may be configured to be performed on other information generated during the coding, such as the selected coding mode and motion vector (MV) data, to reduce a bit rate. Statistical coding is a lossless coding mode that can reduce a bit rate for expressing a same signal. A statistical coding mode may include variable length coding (VLC) or context adaptive binary arithmetic coding (CABAC).

A CABAC process may include 3 operations: binarization, context modeling, and binary arithmetic coding. After binarization of inputted syntax elements, the binary data may be coded by a regular coding mode and a bypass coding mode. The bypass coding mode may not be configured for assignment of a probability model to each binary bit, and an inputted binary bit bin value may be directly coded using a bypass encoder to hasten the encoding and decoding process. Different syntax elements may not be independent, and identical syntax elements may have a same memory. Therefore, according to a conditional entropy theory, using other coded syntax elements for conditional coding can further improve coding performance compared with independent coding or memoryless coding. Such coded symbolic information that is used as a condition is called a context. In the regular coding mode, binary bits of a syntax element sequentially enter a context modeler. The encoder assigns a probability model for each inputted binary bit according to a value of a previously coded syntax element or binary bit. This process is called context modeling. A context model corresponding to a syntax element may be located by using a context index increment (ctxIdxInc) and a context index start (ctxIdxStart). After the bin value and the assigned probability model are fed together into a binary arithmetic encoder for coding, the context model may be updated according to the bin value. This is an adaptive process in the coding.

Loop filtering: Operations such as inverse quantization, inverse transform, and predictive compensation are performed on a transformed and quantized signal to obtain a reconstructed image. The reconstructed image has some information different from that in an original image as a result of quantization, for example, the reconstructed image may cause distortion. Therefore, a filtering operation may be performed on the reconstructed image, for example, by using filters such as a deblocking filter (DB), a sample adaptive offset (SAO) filter, or an adaptive loop filter (ALF), which may reduce a degree of distortion caused by quantization. Since the filtered reconstructed images are to be used as a reference for subsequently coded images to predict future image signals, the filtering operation is also referred to as loop filtering, for example, a filtering operation in a coding loop.

Figure 3:
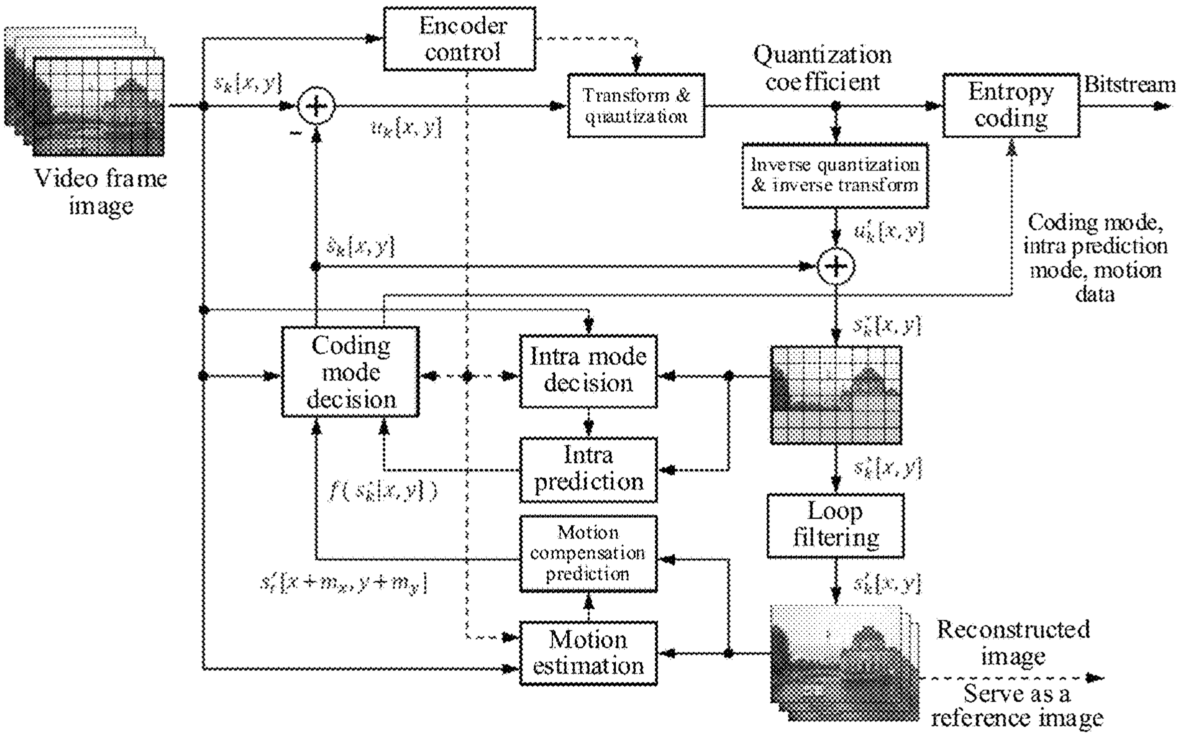
FIG. 3 is a flowchart of a video encoder.

In some embodiments, FIG. 3 is a flowchart of a video encoder. In this process, intra prediction is used as an example for description. A difference between an original image signal $s_k[x, y]$ and a predicted image signal $\hat{s}_k[x, y]$ is calculated to obtain a residual signal $u_k[x, y]$, and the residual signal $u_k[x, y]$ is transformed and quantized to obtain a quantization coefficient. The quantization coefficient is subjected to entropy coding to obtain a coded bitstream, and is further subjected to inverse quantization and inverse transform to obtain a reconstructed residual signal $u'_k[x, y]$. The predicted image signal $\hat{s}_k[x, y]$ is superimposed with the reconstructed residual signal $u'_k[x, y]$ to generate an image signal $$s_k^*[x, y].$$

The image signal $$s_k^*[x, y]$$

is inputted to an intra mode decision module and an intra prediction module for intra prediction, and is further subjected to loop filtering to output a reconstructed image signal $s'_k[x, y]$. The reconstructed image signal $s'_k[x, y]$ may be used as a reference image for a next frame for motion estimation and motion compensation prediction. A predicted image signal $\hat{s}_k[x, y]$ of the next frame is obtained based on a motion compensation prediction result $s'_r[x+m_x, y+m_y]$ and an intra prediction result $$f(s_k^*[x, y]).$$

The above process is repeated until the coding is performed.

Based on the above coding process, at the decoding end, for each CU (or coding block), after a compressed bitstream (for example, bitstream) is acquired, entropy decoding is performed to obtain various mode information and quantization coefficients. Inverse quantization and inverse transform are performed on the quantization coefficients to obtain a residual signal. Moreover, a predicted signal corresponding to the CU (or coding block) may be obtained according to coding mode information that is known. The residual signal may be added to the predicted signal to obtain a reconstructed signal. The reconstructed signal is subjected to operations such as loop filtering to generate a final output signal.

Video coding standards (such as HEVC, VVC, AVS3, AV1, and AV2) use block-based hybrid coding frameworks. Original video data may be partitioned into a series of blocks, and video data compression may be implemented with reference to video coding methods such as prediction, transform, and entropy coding. Motion compensation is a prediction method that may be used in video coding. The motion compensation derives a prediction value of a current block from a coded region based on a redundancy characteristic of video content in a time domain or a space domain. Such prediction methods include: inter prediction, intra block copy prediction, intra string copy prediction, and the like. In some embodiments, these prediction methods may be used alone or in combination. For a coded block using these prediction methods, it may explicitly or implicitly code one or more two-dimensional displacement vectors in a bitstream, indicating a displacement of a current block (or a co-located block of the current block) relative to one or more reference blocks thereof.

A full name of AV1 is Alliance for Open Media Video 1, and it is the first-generation video coding standard formulated by the Alliance for Open Media. A full name of AV2 is Alliance for Open Media Video 2, and it is the second-generation video coding standard formulated by the Alliance for Open Media.

In different prediction modes and different implementations, a displacement vector may have different names. Some embodiments are described in the following manner: 1) a displacement vector in inter prediction is referred to as an MV; 2) a displacement vector in IBC is referred to as a BV; and 3) a displacement vector in intra string copy is referred to as a string vector (SV). Relevant technologies in inter prediction and IBC prediction are described below.

Figure 4:
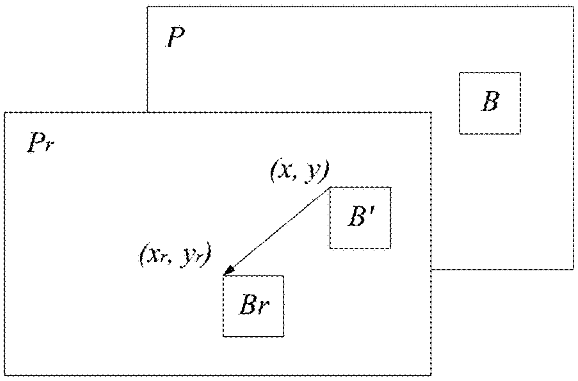
FIG. 4 is a schematic diagram of inter prediction.

As shown in FIG. 4, inter prediction uses correlation in a video time domain to predict a pixel of a current image by using a pixel of an adjacent coded image, to remove video time domain redundancy and save a bit of coded residual data. P represents a current frame, Pr represents a reference frame, B represents a current coding block, and Br represents a reference block of B. Coordinates of B' in the reference frame are the same as coordinates of B in the current frame, coordinates of Br are $(x_r, y_r)$, coordinates of the B' are (x, y), and a displacement between the current block and the reference block is referred to as an MV, where $MV=(x_r-x, y_r-y)$.

In consideration of strong correlation of temporally or spatially adjacent blocks, an MV prediction technology may be used for further reducing bits for coding an MV. In H.265/HEVC, inter prediction includes two types of MV prediction technologies: merge and advanced motion vector prediction (AMVP). In the merge mode, an MV candidate list may be established for a prediction unit (PU), where there may be 5 candidate MVs (and reference images corresponding thereto). The 5 candidate MVs are traversed, and an MV with a lowest rate distortion cost may be selected. If a codec establishes a candidate list in a same manner, the encoder may transmit an index of the selected MV in the candidate list. The MV prediction technology of HEVC also has a skip mode, which is a case of the merge mode. After the MV is selected in the merge mode, if a current block and a reference block are the same, residual data may not be transmitted, and only an index of the MV and a skip flag may be transmitted.

Similarly, the AMVP mode establishes a candidate prediction MV list for a current PU by using MV correlation between spatially and temporally adjacent blocks. Unlike the merge mode, a prediction MV is selected from the candidate prediction MV list in the AMVP mode, and differential coding is performed between the selected prediction MV and the selected MV obtained by motion search on the current coding block, for example, coding MVD=MV−MVP. By establishing a same list, the decoding end may calculate the MV of the current coding block by using sequence numbers of a motion vector difference (MVD) and a motion vector predictor (MVP) in the list. An AMVP candidate MV list may also include a space domain and a time domain, but a length of the AMVP list is only 2.

Figure 5:
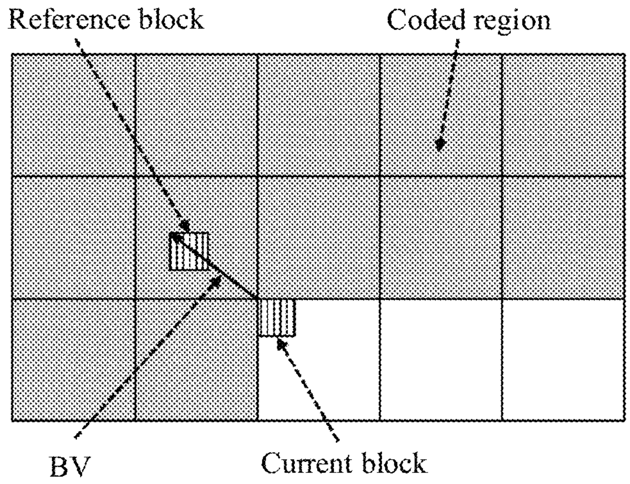
FIG. 5 is a schematic diagram of intra block copy (IBC).

IBC is a coding tool adopted in screen content coding (SCC) extension of HEVC, which significantly improves coding efficiency of screen content. In AVS3 and VVC, an IBC technology is also adopted to improve coding performance of screen content. The IBC may save bits for coding pixels by using spatial correlation of screen content videos and using pixels of a currently coded image to predict pixels of a current to-be-coded block. As shown in FIG. 5, a displacement between a current block and a reference block thereof in IBC is referred to as a BV.

Figure 6:
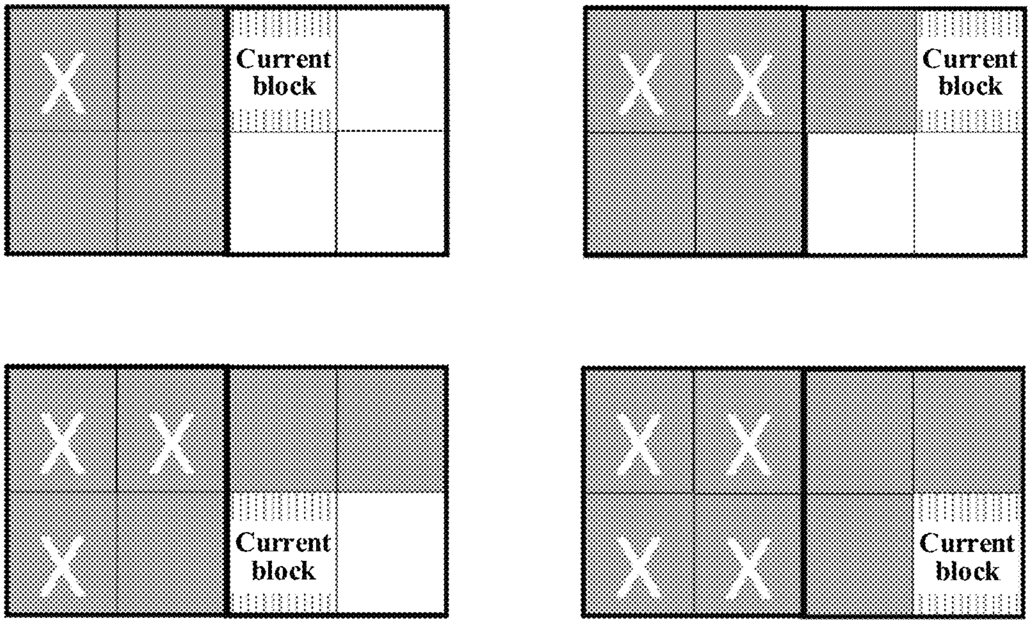
FIG. 6 is a schematic diagram of reference ranges of IBC of versatile video coding (VVC) and a 3rd generation audio video coding standard (AVS3).

In different standards, IBC has different reference ranges based on performance and complexity considerations. In the VVC and AVS3 standards, in order to facilitate hardware implementation, the IBC only uses a memory having a size of 1 CTU. As shown in FIG. 6, in addition to storing a current to-be-reconstructed 64×64 CU, there are also 3 64×64 CUs that may be configured to store reconstructed pixels (for example, the CU represented by an unmarked padding region in FIG. 6). Therefore, the IBC can only search for reference blocks in these three 64×64 CUs and part of the current block that has been reconstructed.

In the AV1 standard, a scheme of a global reference range is used in the IBC mode, for example, a reconstructed region of the current frame is allowed to be used as a reference block of the current block. However, since the IBC uses an off-chip memory to store reference samples, the following restrictions may be added to address potential hardware implementation issues of the IBC:

1) If the IBC mode is allowed for the current image, the loop filter may be disabled, thereby preventing an additional image storage requirement. To reduce an impact of shutdown of the loop filter, the IBC mode is allowed to be used only in keyframes.
2) A position of the reference block may be determined based on a limitation of hardware writeback delay. For example, a region of 256 reconstructed samples in a horizontal direction of the current block is not allowed to be used as a reference block.
3) The position of the reference block may be determined based on a limitation of parallel processing.

Figure 7:
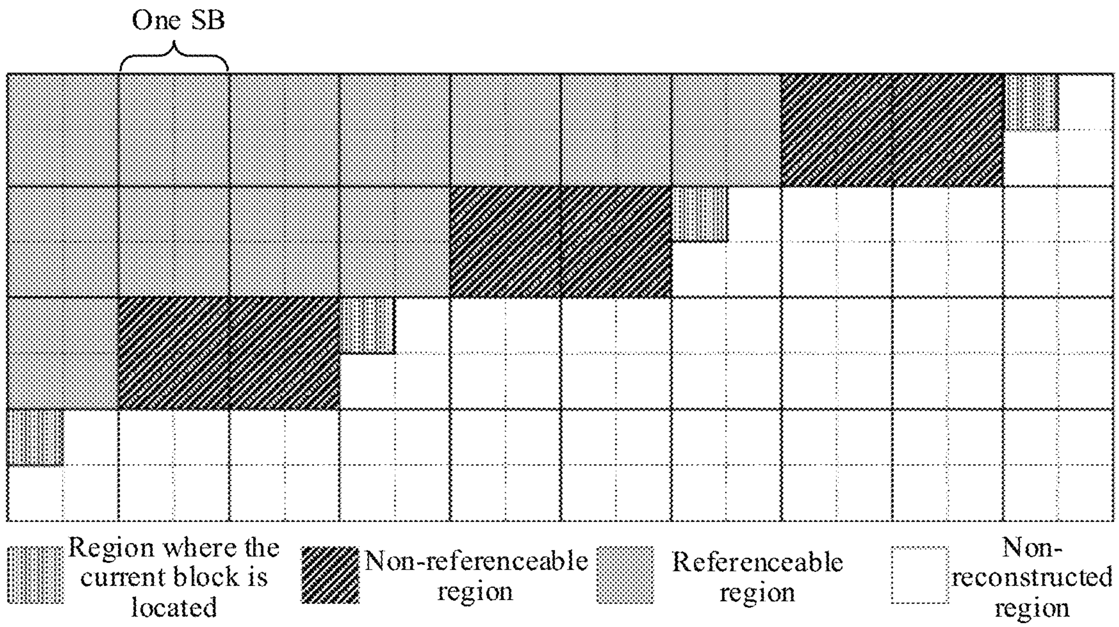
FIG. 7 is a schematic diagram of a reference range of IBC in Alliance for Open Media Video 1 (AV1).

Reference may be made to a schematic diagram of a reference range of IBC in a current AV1 standard shown in FIG. 7. A size of an SB is 128×128, the encoder performs parallel coding by SB rows, and the region of 256 reconstructed samples in the horizontal direction of the current block (for example, a size of two SBs) is not allowed to be used as a reference block.

Figure 8:
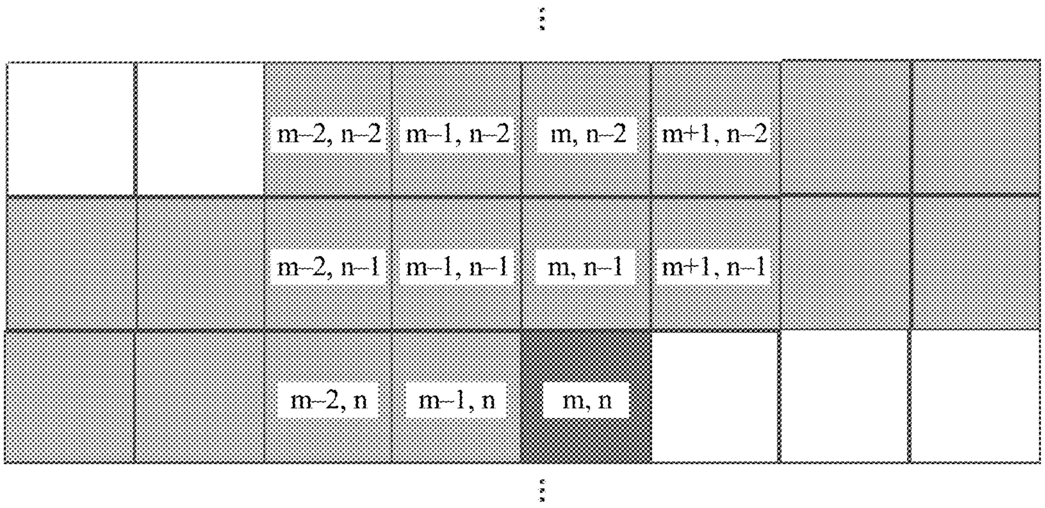
FIG. 8 is a schematic diagram of a reference range of IBC in an enhanced compression model (ECM) platform.

In an ECM software platform, a reference region of IBC is expanded to include a region of a current CTU row and two CTU rows above. As shown in FIG. 8, reference blocks allowed by a CTU (m, n) include CTUs whose indexes are (m−2, n−2) . . . (W, n−2); (0, n−1) . . . (W, n−1); and (0, n) . . . (m, n), where W represents a maximum CTU column index in a current tile, slice or image.

Since there are a lot of symmetric content in a screen content sequence, an IBC mode is used in an ECM, which is referred to as an RRIBC mode. In the mode, firstly, a predicted block is derived and reconstructed using a method similar to the IBC mode, and then the reconstructed block is flipped according to a flip mode selected by the RRIBC. The RRIBC includes two flip modes, for example, horizontal flip and vertical flip.

A block partition structure referred to as a dual tree may be used in a VVC reference platform VTM and a reference software platform ECM for next-generation video coding standards. The block partition structure allows luma and chroma to have separate partition trees. In the VVC, the dual tree is allowed to be used only in an I slice. For CTUs in a P Slice and a B Slice, a luma coding tree block (CTB) and a chroma CTB may share a same block partition tree.

The ECM further includes an intra prediction mode referred to as intra template matching prediction (IntraTmp). In the IntraTmp mode, the decoding end and the coding end adopt a same search strategy to adaptively search for a matching block from a reconstructed part of the current frame according to a degree of matching between an L-shaped template of the reference block and an L-shaped template of the current block, and the decoding end may not use additional coding of BVs.

In existing standards such as AVS3 and VVC, based on complexity considerations, if the dual tree is used in the partition structure and the current block is a chroma block, the IBC mode is not allowed to be used. This design limits the use of the IBC mode. For the screen content sequence, disabling the IBC mode for chroma blocks under dual tree partition may bring a performance loss. Some embodiments provide a method for deriving a BV of a chroma block. According to some embodiments, the BV of the chroma block can be adaptively derived by using correlation between a luma component and a chroma component of a video, which helps further improve coding performance.

Implementation details of the technical solution in some embodiments are described below.

Figure 9:
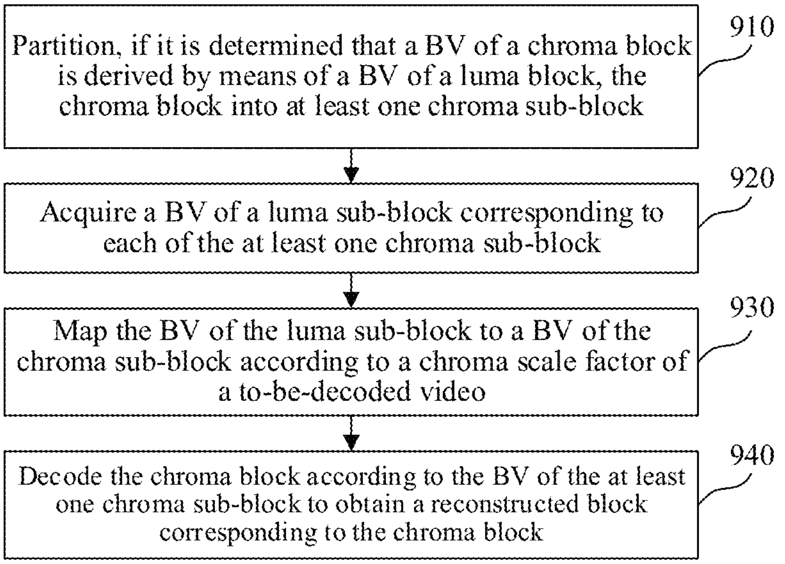
FIG. 9 is a flowchart of a video decoding method according to some embodiments.

FIG. 9 is a flowchart of a video decoding method according to some embodiments. The video decoding method may be performed by a device with a computing function, such as a terminal device or a server. With reference to FIG. 9, the video decoding method includes operation 910 to operation 940 below. A detailed description is as follows:

Operation 910: Partition, if it is determined that a BV of a chroma block is derived by means of a BV of a luma block, the chroma block into at least one chroma sub-block.

In some embodiments, if a to-be-decoded chroma block adopts an IBC mode (or other modes that use BVs for prediction; the following relevant content is similar to this description) and the chroma block and a corresponding luma block adopt different partition modes, it may be determined that a BV of the chroma block is derived by means of a BV of the luma block. In some embodiments, "the chroma block and a corresponding luma block adopt different partition modes" may mean that, for example, the chroma block and the luma block adopt a dual tree partition structure.

In some embodiments, if it is determined that the BV of the chroma block may be derived, the luma block corresponding to the chroma block may satisfy the following condition: a sample point in a specified region in the luma block adopts a specified prediction mode (the specified prediction mode includes a BV-based prediction mode, such as IBC, RRIBC, and IntraTmp); and the specified region includes at least one of the following: an upper-left corner region of the luma block, an upper-right corner region of the luma block, a lower-left corner region of the luma block, a lower-right corner region of the luma block, a central region of the luma block, and a specified position in a luma sub-block corresponding to each of the at least one chroma sub-block.

For a video using a YUV color coding method, each luma block Y corresponds to a Cb and a Cr chroma block, and each chroma block corresponds to only one luma block. Taking a sampling format of YUV420 as an example, a size of a luma block corresponding to an N×M block is N×M, and sizes of two corresponding chroma blocks are both (N/2)×(M/2). The chroma block is ¼ the size of the luma block. For a sampling format of YUV444, the luma block and the chroma block have a same size.

Operation 920: Acquire a BV of a luma sub-block corresponding to each of the at least one chroma sub-block.

In some embodiments, a process of acquiring the BV of the luma sub-block corresponding to each of the at least one chroma sub-block may include sequentially deriving a BV from at least one set position on the luma sub-block in a set order, and determining the BV of the luma sub-block based on the derived BV.

A sample point (for example, pixel) at least one set position on the luma sub-block adopts the specified prediction mode. The specified prediction mode is one or more of an IBC mode, an RRIBC mode, and an IntraTmp mode. The at least one set position may be selected from the following regions: an upper-left corner region of the luma block, an upper-right corner region of the luma block, a lower-left corner region of the luma block, a lower-right corner region of the luma block, a central region of the luma block, and a specified position in a luma sub-block corresponding to each of the at least one chroma sub-block.

A process of deriving the BV from the at least one set position on the luma sub-block is described in detail below:

In some embodiments, for any set position on the luma sub-block (for example, processing may be performed in this manner for each set position), if a target luma block to which a sample point at the set position belongs adopts a normal IBC mode, a BV of the target luma block is taken as the BV derived from the set position.

The normal IBC mode refers to a mode in which a prediction value of a current block is derived according to a BV, and is different from RRIBC. This mode is referred to as the IBC mode in the AVS3, VVC, and AV1 standards. The target luma block to which the sample point at the set position belongs refers to a luma block where the sample point at the set position is located, which may also be referred to as a luma prediction unit.

In some embodiments, for any set position on the luma sub-block (for example, processing may be performed in this manner for each set position), if a target luma block to which a sample point at the set position belongs adopts an RRIBC mode, the BV at the set position may be derived in one of the following modes:

taking a BV of the target luma block as the BV derived from the set position;

taking a default BV as the BV derived from the set position;

taking an invalid BV as the BV derived from the set position (for example, it is considered that an invalid BV is derived from the set position); and determining the BV derived from the set position according to size and coordinate information of the luma sub-block, size and coordinate information of the target luma block, and the BV of the target luma block.

In some embodiments, the determining the BV derived from the set position according to size and coordinate information of the luma sub-block, size and coordinate information of the target luma block, and the BV of the target luma block includes: determining, according to width and horizontal coordinate information of the luma sub-block, width and horizontal coordinate information of the target luma block, and a horizontal component of the BV of the target luma block, a horizontal component of the BV derived from the set position if the RRIBC mode is a horizontal flip mode; and taking a vertical component of the BV of the target luma block as a vertical component of the BV derived from the set position.

In some embodiments, the determining the BV derived from the set position according to size and coordinate information of the luma sub-block, size and coordinate information of the target luma block, and the BV of the target luma block includes: determining, according to height and vertical coordinate information of the luma sub-block, height and vertical coordinate information of the target luma block, and a vertical component of the BV of the target luma block, a vertical component of the BV derived from the set position if the RRIBC mode is a vertical flip mode; and taking a horizontal component of the BV of the target luma block as a horizontal component of the BV derived from the set position.

In some embodiments, for any set position on the luma sub-block (for example, processing may be performed in this manner for each set position), if a target luma block to which a sample point at the set position belongs adopts an IntraTmp mode, the BV at the set position may be derived in one of the following modes:

taking a BV of the target luma block as the BV derived from the set position;

taking a default BV as the BV derived from the set position; and taking an invalid BV as the BV derived from the set position (for example, it is considered that an invalid BV is derived from the set position).

In some embodiments, for any set position on the luma sub-block (for example, processing may be performed in this manner for each set position), if a target luma block to which a sample point at the set position belongs adopts a non-specified prediction mode, the BV at the set position may be derived in one of the following modes, where the specified prediction mode includes one or more of a normal IBC mode, an RRIBC mode, and an IntraTMP mode:

taking a default BV as the BV derived from the set position; and taking an invalid BV as the BV derived from the set position (for example, it is considered that an invalid BV is derived from the set position).

Based on the above operations, when deriving the BV from the at least one set position on the luma sub-block, the decoding end determines the BV of the luma sub-block based on the derived BV.

In some embodiments, a derived valid BV is determined to be the BV of the luma sub-block.

In some embodiments, the invalid BV described above is distinguished from the valid BV, the valid BV may be determined according to at least one of the following conditions. For example, if at least one of the following conditions is met, the derived BV is determined to be the valid BV:

a prediction mode adopted by a sample point at the set position is a specified prediction mode, the specified prediction mode including one or more of a normal IBC mode, an RRIBC mode, and an IntraTmp mode; and the derived BV is within a reference range allowed by an IBC mode.

In some embodiments, if the BV derived from the set position is an illegal BV, the illegal BV is converted into a valid BV according to a set strategy, and the valid BV is determined to be the BV of the luma sub-block. For example, the set strategy may include converting a BV within a reference range not allowed by the IBC mode into a BV within the reference range allowed by the IBC mode.

In some embodiments, if no valid BV is derived from at least one set position on the luma sub-block, the default BV may be taken as the BV of the luma sub-block.

In some embodiments, the default BV includes at least one of the following:

a valid BV derived from one or more specified positions on the luma block corresponding to the chroma block;

a BV in a history-based BV prediction (HBVP) list;

a BV of a previous luma sub-block;

a BV of another luma sub-block spatially adjacent to a current luma sub-block (e.g., the luma sub-block on the left or above the current luma sub-block); and a set BV.

Operation 930: Map the BV of the luma sub-block to a BV of the chroma sub-block according to a chroma scale factor of a to-be-decoded video.

In some embodiments, the chroma scale factor includes a first scale factor in a horizontal direction and a second scale factor in a vertical direction. In some embodiments, a width and a height of a luma image and a width and a height of a chroma image of the to-be-decoded video may be acquired; a first ratio of the width of the luma image to the width of the chroma image may be calculated, and a logarithm of the first ratio with a base of 2 may be taken as the first scale factor; a second ratio of the height of the luma image to the height of the chroma image may be calculated, and a logarithm of the second ratio with a base of 2 may be taken as the second scale factor.

In some embodiments, when the BV of the luma sub-block is mapped to the BV of the chroma sub-block, a horizontal component of the BV of the luma sub-block may be right-shifted according to a value of the first scale factor to obtain a horizontal component of the BV of the chroma sub-block; and a vertical component of the BV of the luma sub-block may be right-shifted according to a value of the second scale factor to obtain a vertical component of the BV of the chroma sub-block.

"Right-shift" in some embodiments is a bit operation. In a computer program, values are expressed in binary forms. For example, binary forms corresponding to {0, 1, 2} are {0, 1, 10} respectively. If these numbers are expressed in 8 bits (for example, one byte), they are {0000 0000, 0000 0001, 0000 0010}. Right-shifting one bit means moving one binary bit backwards, discarding a part that exceeds a bit width (8 bits), and filling empty bits with 0s. Right-shifting one bit means moving values of 0000 0010 to the right to obtain a result of 0000 0001.

Right shift is just a manner of being divided by 2. Right shift may mean being divided by a value of $n^{th}$ power of 2, where n represents a value of a scale factor. For example, for a video of YUV420, if a width and a height of a luma image is twice a width and a height of a chroma image, the first scale factor and the second scale factor are both 1. In this case, the BV of the chroma sub-block is ½ the BV of the luma sub-block.

Operation 940: Decode the chroma block according to the BV of the at least one chroma sub-block to obtain a reconstructed block corresponding to the chroma block.

In some embodiments, a process of decoding the chroma block according to the BV of the at least one chroma sub-block may include: generating a predicted sub-block of the at least one chroma sub-block according to the BV of the at least one chroma sub-block, then performing chroma sub-block reconstruction processing according to the predicted sub-block of the at least one chroma sub-block to obtain at least one reconstructed chroma sub-block, and then generating a corresponding reconstructed block of the chroma block according to the at least one reconstructed chroma sub-block.

If the BV of the chroma sub-block is obtained by mapping the BV of the luma sub-block adopting the RRIBC mode, after the predicted sub-block of the chroma sub-block is generated, and the generated predicted sub-block may be flipped according to a flip mode (horizontal flip or vertical flip) of the luma sub-block adopting the RRIBC mode; or after the chroma sub-block is reconstructed, the reconstructed chroma sub-block is flipped according to a flip mode of the luma sub-block adopting the RRIBC mode.

Some embodiments are described from the perspective of the decoding end as illustrated in FIG. 9, for example.

Figure 10:
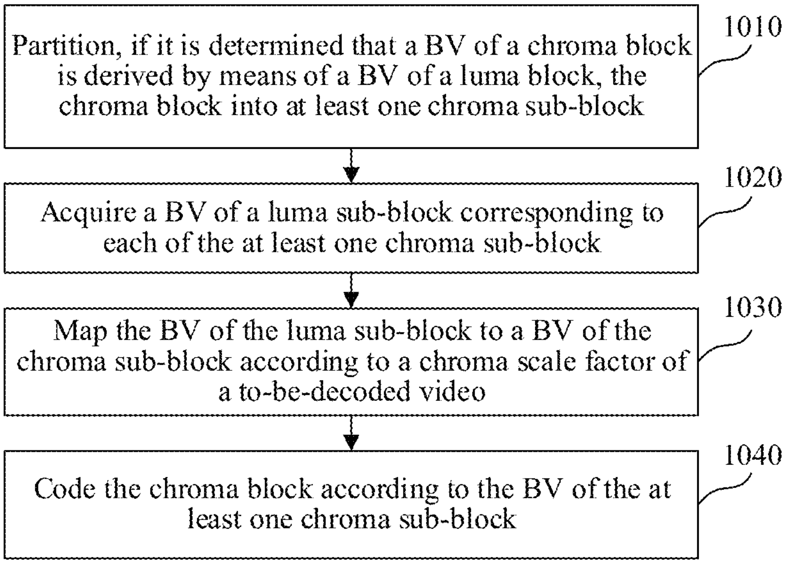
FIG. 10 is a flowchart of a video coding method according to some embodiments.

FIG. 10 is a flowchart of a video coding method according to some embodiments. The video coding method may be performed by a device with a computing function, such as a terminal device or a server. With reference to FIG. 10, in some embodiments, the video coding method includes at least operation 1010 to operation 1030.

Operation 1010: Partition, if it is determined that a BV of a chroma block is derived by means of a BV of a luma block, the chroma block into at least one chroma sub-block.

In some embodiments, if BVs derived from respective sample points included in a to-be-coded chroma block are all valid BVs, a rate distortion cost corresponding to a coding mode in which a BV of the chroma block is derived by means of a BV of a luma block is minimum, it is determined that the BV of the chroma block adopting a specified prediction mode is derived by means of the BV of the luma block. When BVs derived from respective sample points included in a to-be-coded chroma block are all valid BVs, it is determined that the BV of the chroma block adopting a specified prediction mode is derived by means of the BV of the luma block. The specified prediction mode includes a BV-based prediction mode, such as IBC, RRIBC, and IntraTmp modes.

If at least one of the following conditions is met, the derived BV is determined to be a valid BV:

- a prediction mode adopted by a sample point is a specified prediction mode, the specified prediction mode including one or more of a normal IBC mode, an RRIBC mode, and an IntraTmp mode; and
- the derived BV is within a reference range allowed by an IBC mode.

Operation 1020: Acquire a BV of a luma sub-block corresponding to each of the at least one chroma sub-block.

Operation 1030: Map the BV of the luma sub-block to a BV of the chroma sub-block according to a chroma scale factor of a to-be-decoded video.

Operation 1040: Code the chroma block according to the BV of the at least one chroma sub-block.

For implementation details of the video coding method as shown in FIG. 10, for example, reference may be made to descriptions of the video decoding method.

According to some embodiments, a BV of a chroma block may be adaptively derived according to a BV of a luma block by using correlation between a luma component and a chroma component of a video, which helps further improve coding performance.

Some embodiments are described in detail below from the perspective of the decoding end.

In some embodiments, after a to-be-decoded bitstream is acquired, the bitstream may be decoded to acquire information of a to-be-decoded current block. A BV is derived if the current block satisfies the following condition: the current block is a chroma block, the prediction mode is IBC, and a partition mode of the current block is dual_tree (or a current chroma block and a corresponding luma co-located block adopt different partition modes).

In some embodiments, the current block may further satisfy the following condition: sample points at specified positions of the luma co-located block (region) corresponding to the current chroma block use the IBC mode. The specified positions are sample points at an upper left corner, an upper right corner, a lower left corner, a lower right corner, and a central position of the current luma co-located block (region). The specified positions may be sample points at specified positions in each M×N luma sub-block.

In some embodiments, the current block may be partitioned into M×N sub-blocks for processing. M and N are positive integers. M is less than or equal to a width W of the current block. N is less than or equal to a height H of the current block. For example, a preset size may be 2×2, for example, the current block is partitioned into 2×2 sub-blocks and is processed sub-block by sub-block. The preset size may be W×H, for example, processing is based on the current block which may not be partitioned into sub-blocks.

After it is determined that the BV is to be derived and the current chroma block is to be partitioned, a co-located luma sub-block (region) corresponding to the sub-block is acquired, and a BV of the co-located luma sub-block (region) is derived in the following mode: specifying K positions in a specified co-located luma sub-block (region), a value of K being less than or equal to 1, and deriving BVs from sample points at the K positions in sequence until a valid BV is obtained.

In some embodiments, if no valid BV is derived, a default BV is used.

In some embodiments, the BV of the co-located luma sub-block (region) may be derived with the following methods:

(1) If a luma block (prediction unit) to which a current sample point belongs adopts a normal IBC mode, the BV of the luma block (prediction unit) to which the current sample point belongs is derived as the BV of the current co-located luma sub-block (region).

(2) If the luma block (prediction unit) corresponding to the current sample point is in an RRIBC mode, there are the following derivation manners:

the BV of the luma block (prediction unit) to which the current sample point belongs is directly derived as the BV of the current co-located luma sub-block (region);

a default BV is used; and the BV derived in the mode is an invalid BV.

In consideration of characteristics of RRIBC, a BV (flipBV_x, flipBV_y) may be derived based on the following formula according to different flip types.

Figure 11:
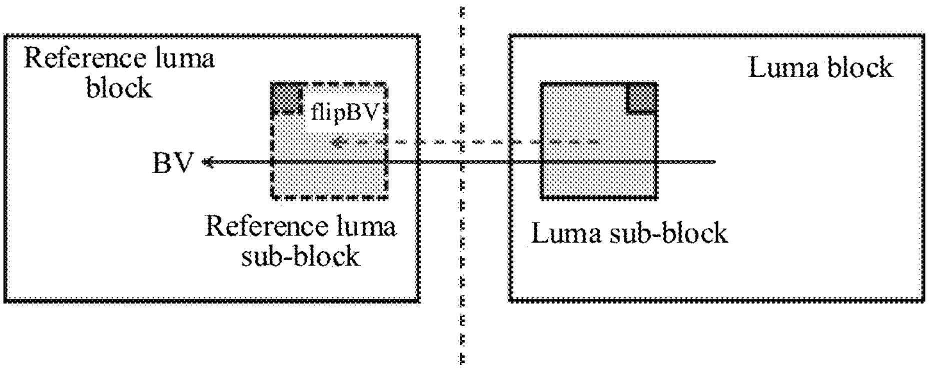
FIG. 11 is a schematic diagram of horizontal flip in an RRIBC mode according to some embodiments.

In some embodiments, if the flip type of RRIBC is horizontal flip, as shown in FIG. 11, a calculation formula is as follows:

$$\text{flipBV\_x} = 2\times\text{parentBlk\_x} + \text{parentBlk\_width} - 2\times\text{subBlk\_x} - \text{subBlk\_width} + \text{bv\_x}$$

$$\text{flipBV\_y} = \text{bv\_y}$$

Figure 12:
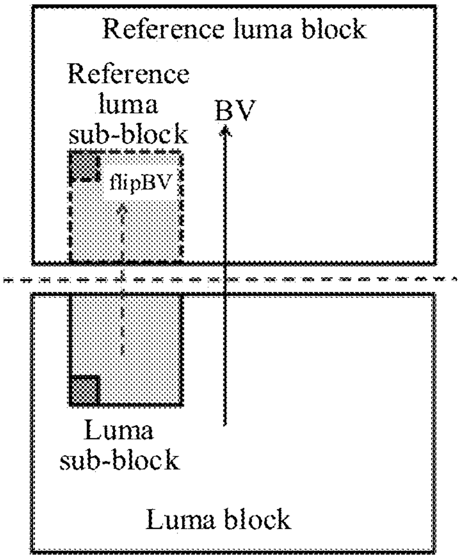
FIG. 12 is a schematic diagram of vertical flip in an RRIBC mode according to some embodiments.

If the flip type of RRIBC is vertical flip, as shown in FIG. 12, a calculation formula is as follows:

$$\text{flipBV\_x} = \text{bv\_x}$$

$$\text{flipBV\_y} = 2\times\text{parentBlk\_y} + \text{parentBlk\_height} - 2\times\text{subBlk\_y} - \text{subBlk\_height} + \text{bv\_y}$$

In the above formula, parentBlk_x and parentBlk_y respectively represent horizontal coordinates and vertical coordinates (such as coordinates at an upper-left corner position) of a luma block (prediction unit) where a luma sample point is located; parentBlk_width and parentBlk_height respectively represent a width and a height of the luma block (prediction unit) where the luma sample point is located; subBlk_x and subBlk_y respectively represent horizontal coordinates and vertical coordinates (such as coordinates at an upper-left corner position) of a co-located luma sub-block (region) corresponding to a chroma sub-block; subBlk_width and subBlk_height respectively represent a width and a height of the co-located luma sub-block (region) corresponding to the chroma sub-block; and bv_x and bv_y respectively represent a horizontal component and a vertical component of a BV of the luma block (prediction unit) where the luma sample point is located.

(3) If the luma block (prediction unit) corresponding to the current sample point is in an IntraTmp mode, there are the following derivation modes:

the BV of the luma block (prediction unit) to which the current sample point belongs is directly derived as the BV of the current co-located luma sub-block (region);

a default BV is used; and the BV derived in the mode is an invalid BV.

(4) If the luma block (prediction unit) corresponding to the current sample point is in a non-specified prediction mode, where the specified prediction mode includes one or more of an IBC mode, an RRIBC mode, and an IntraTMP mode, there are the following derivation modes:

a default BV is used; and the BV derived in the mode is an invalid BV.

In some embodiments, the valid BV may satisfy at least one of the following condition: the prediction mode adopted by the sample point is a specified prediction mode, where the specified prediction mode includes one or more of an IBC mode, an RRIBC mode, and an IntraTMP mode; and the BV is within a reference range allowed by IBC, and if not within the reference range, the BV is an invalid BV.

In some embodiments, if the derived BV is an illegal BV (e.g., the BV points to a reference region not allowed by IBC), the BV of the luma block is converted into a legal BV for current block prediction. An example of deriving the legal BV is to use a legal reference region to truncate the BV so that the BV falls within a legal BV region.

In some embodiments, a method for deriving a default BV is as follows. The following methods may be used alone or in combination in a preset order: searching for one or more positions based on a co-located luma block (region) corresponding to a current chroma block (a non-chroma sub-block), and deriving a valid BV as a preset BV; an $N^{th}$ BV in HBVP; a BV of a previous sub-block; a BV of a spatially adjacent sub-block; and a specified BV.

In some embodiments, after the BV of the luma block is obtained, a BV of the luma block lumaBV may be mapped to a BV of the chroma block chromaBV according to a color format of a current video.

chromaBV_x=lumaBV_x>>chromaScaleX; and chromaBV_y=lumaBV_y>>chromaScaleY. chromaScaleX and chromaScaleY represent chroma scale factors, and ">>" represents a right-shift operation.

In some embodiments, the chroma scale factors (chromaScaleX, chromaScaleY) may be determined according to the color format of the current video. It is assumed that a width and a height of a luma component of an image frame in the current video are (pic_width_luma, pic_height_luma) and a width and a height of a chroma image is (pic_width_chroma, pic_height_chroma). Then, $$chromaScaleX = \text{log2}(\text{pic\_width\_luma}/\text{pic\_width\_chroma}); \text{ and}$$

$$chromaScaleY = \text{log2}(\text{pic\_height\_luma}/\text{pic\_height\_chroma}).$$

If a color format of a current image is YUV444, (pic_width_luma/pic_width_chroma, pic_height_luma/pic_height_chroma)=(1,1), and (chromaScaleX, chromaScaleY)=(0,0).

If the color format of the current image is YUV422, (pic_width_luma/pic_width_chroma, pic_height_luma/pic_height_chroma)=(2,1), and (chromaScaleX, chromaScaleY)=(1,0).

If the color format of the current image is YUV420, (pic_width_luma/pic_width_chroma, pic_height_luma/pic_height_chroma)=(2,2), and (chromaScaleX, chromaScaleY)=(1,1).

In some embodiments, after the BV of the chroma sub-block is derived, the current chroma block derives a corresponding prediction value based on the BV of the chroma sub-block and performs reconstruction. If the BV of the current chroma sub-block is derived from a luma sample point in the RRIBC mode, a reconstructed sub-block or a predicted sub-block may be flipped. The flip type is consistent with the luma sample point.

In some embodiments, a method for acquiring a co-located luma block (region) corresponding to a chroma block is as follows: it is assumed that upper-left corner point coordinates of the current chroma block are (xc, yc), and a width and a height of the chroma block are (wc, hc); and a luma to chroma scale factor is determined according to an image color format (chromaScaleX, chromaScaleY), and then upper-left corner coordinates of the luma block corresponding to the current chroma block are (xc<<chromaScaleX, yc<<chromaScaleY), and the width and the height are (wc<<chromaScaleX, hc<<chromaScaleY). "<<" represents a left-shift operation.

a region of the luma block may be determined according to a region of the chroma block. This region includes a plurality of sample points. Since the luma block and the chroma block adopt different partition methods, the sample points may belong to a same luma block or a plurality of different luma blocks.

In some embodiments, a chroma block is partitioned into sub-blocks to derive a BV. For the decoding end, valid BVs may be derived from the position by default, and the validity of the BVs may not be checked. The coding end checks the validity. The process at the coding end is as follows:

1) A bitstream is decoded, and information of a current block is acquired. A BV is derived if the current block satisfies the following condition: the current block is a chroma block and the prediction mode is IBC, and a partition mode of the current block is dual_tree (or a current chroma block and a corresponding luma co-located block adopt different partition modes).
2) The current block is partitioned into 2×2 sub-blocks for processing.
3) A co-located luma sub-block (region) corresponding to the chroma sub-block is acquired, and a BV of the co-located luma sub-block (region) is derived in the following mode:

specifying 1 position in the co-located luma sub-block (region). The position is an upper-left corner position of the co-located luma sub-block. A BV is derived from a sample point at this position (it is defaulted at the decoding end that a valid BV is derived from this position, and no checking may be performed; the coding end performs checking).

In some embodiments, a method for deriving the BV of the co-located luma sub-block (region) is as follows:

if a luma block (prediction unit) to which a current sample point belongs adopts a normal IBC mode, the BV of the luma block (prediction unit) to which the current sample point belongs is derived as the BV of the current co-located luma sub-block (region).

If the luma block (prediction unit) to which the current sample point belongs adopts an RRIBC mode, in consideration of characteristics of RRIBC, a BV (flipBV_x, flipBV_y) may be derived based on the following formula according to different flip types.

In some embodiments, if the flip type of RRIBC is horizontal flip, a calculation formula is as follows:

$$\text{flipBV\_x} = 2\times\text{parentBlk\_x} + \text{parentBlk\_width} - 2\times\text{subBlk\_x} - \text{subBlk\_width} + \text{bv\_x}$$

$$\text{flipBV\_y} = \text{bv\_y}$$

If the flip type of RRIBC is vertical flip, a calculation formula is as follows:

$$\text{flipBV\_x} = \text{bV\_x}$$

$$\text{flipBV\_y} = 2\times\text{parentBlk\_y} + \text{parentBlk\_height} - 2\times\text{subBlk\_y} - \text{subBlk\_height} + \text{bv\_y}$$

In the above formula, parentBlk_x and parentBlk_y respectively represent horizontal coordinates and vertical coordinates (such as coordinates at an upper-left corner position) of a luma block (prediction unit) where a luma sample point is located; parentBlk_width and parentBlk_height respectively represent a width and a height of the luma block (prediction unit) where the luma sample point is located; subBlk_x and subBlk_y respectively represent horizontal coordinates and vertical coordinates (such as coordinates at an upper-left corner position) of a co-located luma sub-block (region) corresponding to a chroma sub-block; subBlk_width and subBlk_height respectively represent a width and a height of the co-located luma sub-block (region) corresponding to the chroma sub-block; and bv_x and bv_y respectively represent a horizontal component and a vertical component of a BV of the luma block (prediction unit) where the luma sample point is located.

If the luma block (prediction unit) corresponding to the current sample point adopts an IntraTmp mode, the BV of the luma block (prediction unit) to which the current sample point belongs is directly derived as the BV of the current co-located luma sub-block (region).

4) Chroma scale factors (chromaScaleX=1, chromaScaleY) are confirmed according to a color format of a current video, and a vector of a luma block lumaBV is mapped to a vector of a chroma block chromaBV according to the following formulas:

$$\text{chroma}BV\_x = \text{luma}BV\_x >> \text{chromaScale}X; \text{ and}$$

$$\text{chroma}BV\_y = \text{luma}BV\_y >> \text{chromaScale}Y.$$

5) The current chroma block derives a corresponding prediction value based on the BV of the sub-block and performs reconstruction.
6) If the BV of the current sub-block is derived from a luma sample point in the RRIBC mode, a reconstructed sub-block may be flipped. The flip type is consistent with the luma sample point.

In some embodiments, the chroma block is not partitioned into sub-blocks. The process at the coding end is as follows:

1) A bitstream is decoded, and information of a current block is acquired. A BV is derived if the current block satisfies the following condition: the current block is a chroma block, the prediction mode is IBC, and a partition mode of the current block is dual_tree (or a current chroma block and a corresponding luma co-located block adopt different partition modes).

2) A co-located luma block (region) corresponding to the chroma block is acquired, and a BV is derived in the following mode:

specifying 5 positions in the co-located luma block (region), where the 5 positions are respectively a central position, an upper left corner, an upper right corner, a lower left corner, and a lower right corner of the co-located luma block (region); and deriving BVs from sample points at the positions in sequence until a valid BV is obtained.

The valid BV may satisfy the following conditions: the prediction mode adopted by the sample point is a specified prediction mode, where the specified prediction mode includes one or more of an IBC mode, an RRIBC mode, and an IntraTMP mode; and the BV is within a reference range allowed by IBC, and if not within the reference range, the BV is an invalid BV.

According to some embodiments, if the current co-located luma sub-block does not have a legal BV, the method for deriving the default BV is used, the default BV is derived according to the following method: searching for 5 positions based on a co-located luma block (region) corresponding to a current chroma block (a non-chroma sub-block), where the 5 positions are respectively a central position, an upper left corner, an upper right corner, a lower left corner, and a lower right corner of the current block, and deriving a valid BV as a preset BV. If no valid BV exists, a specified BV is used. The specified BV is (−w,0),(0,−h).

According to some embodiments, if the current co-located luma block does not have a legal BV, a specified BV is used. The specified BV is (−w,0),(0,−h).

According to some embodiments, a BV of a chroma block may be adaptively derived according to a BV of a luma block by using correlation between a luma component and a chroma component of a video, which helps further improve coding performance.

An apparatus according to some embodiments is described below. For implementation details, reference may be made to the descriptions of the method according to some embodiments.

Figure 13:
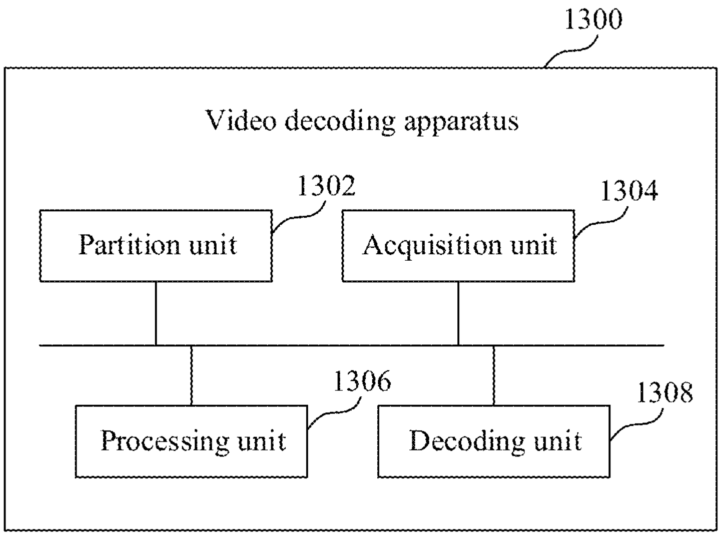
FIG. 13 is a block diagram of a video decoding apparatus according to some embodiments.

FIG. 13 is a block diagram of a video decoding apparatus according to some embodiments. The video decoding apparatus may be disposed in a device with a computing function, such as a terminal device or a server.

Referring to FIG. 13, a video decoding apparatus 1300 according to some embodiments includes: a partition unit 1302, an acquisition unit 1304, a processing unit 1306, and a decoding unit 1308.

The partition unit 1302 is configured to partition, if it is determined that a BV of a chroma block is derived by means of a BV of a luma block, the chroma block into at least one chroma sub-block. The acquisition unit 1304 is configured to acquire a BV of a luma sub-block corresponding to each of the at least one chroma sub-block. The processing unit 1306 is configured to map the BV of the luma sub-block to a BV of the chroma sub-block according to a chroma scale factor of a to-be-decoded video. The decoding unit 1308 is configured to decode the chroma block according to the BV of the at least one chroma sub-block to obtain a reconstructed block corresponding to the chroma block.

In some embodiments, based on the foregoing solution, the video decoding apparatus further includes: a determination unit configured to determine, if a to-be-decoded chroma block adopts a specified prediction mode and the chroma block and a corresponding luma block adopt different partition modes, that a BV of the chroma block is derived by means of a BV of the luma block, the specified prediction mode including a BV-based prediction mode.

In some embodiments, based on the foregoing solution, if it is determined that the BV of the chroma block is to be derived, the luma block corresponding to the chroma block may satisfy the following condition: a sample point in a specified region in the luma block adopts the specified prediction mode;

the specified region includes at least one of the following: an upper-left corner region of the luma block, an upper-right corner region of the luma block, a lower-left corner region of the luma block, a lower-right corner region of the luma block, a central region of the luma block, and a specified position in a luma sub-block corresponding to each of the at least one chroma sub-block.

In some embodiments, based on the foregoing solution, the acquisition unit 1304 is configured to: derive a BV from at least one set position on the luma sub-block in a set order; and determine the BV of the luma sub-block based on the derived BV.

In some embodiments, based on the foregoing solution, the acquisition unit 1304 is further configured to: take, if no valid BV is derived from at least one set position, the default BV as the BV of the luma sub-block.

In some embodiments, based on the foregoing solution, a process in which the acquisition unit 1304 derives a BV from at least one set position on the luma sub-block in a set order includes: for any set position on the luma sub-block, take, if a target luma block to which a sample point at the set position belongs adopts a normal IBC mode, a BV of the target luma block as the BV derived from the set position.

In some embodiments, based on the foregoing solution, a process in which the acquisition unit 1304 derives a BV from at least one set position on the luma sub-block in a set order includes: for any set position on the luma sub-block, derive, if a target luma block to which a sample point at the set position belongs adopts an RRIBC mode, the BV at the set position in one of the following modes:

taking a BV of the target luma block as the BV derived from the set position;

taking a default BV as the BV derived from the set position;

taking an invalid BV as the BV derived from the set position; and determining the BV derived from the set position according to size and coordinate information of the luma sub-block, size and coordinate information of the target luma block, and the BV of the target luma block.

In some embodiments, based on the foregoing solution, the determining the BV derived from the set position according to size and coordinate information of the luma sub-block, size and coordinate information of the target luma block, and the BV of the target luma block includes:

determining, according to width and horizontal coordinate information of the luma sub-block, width and horizontal coordinate information of the target luma block, and a horizontal component of the BV of the target luma block, a horizontal component of the BV derived from the set position if the RRIBC mode is a horizontal flip mode; and taking a vertical component of the BV of the target luma block as a vertical component of the BV derived from the set position.

In some embodiments, based on the foregoing solution, the determining the BV derived from the set position according to size and coordinate information of the luma sub-block, size and coordinate information of the target luma block, and the BV of the target luma block includes:

determining, according to height and vertical coordinate information of the luma sub-block, height and vertical coordinate information of the target luma block, and a vertical component of the BV of the target luma block, a vertical component of the BV derived from the set position if the RRIBC mode is a vertical flip mode; and taking a horizontal component of the BV of the target luma block as a horizontal component of the BV derived from the set position.

In some embodiments, based on the foregoing solution, a process in which the acquisition unit 1304 derives a BV from at least one set position on the luma sub-block in a set order includes:

for any set position on the luma sub-block, deriving, if a target luma block to which a sample point at the set position belongs adopts an IntraTmp mode, the BV at the set position in one of the following modes:

taking a BV of the target luma block as the BV derived from the set position;

taking a default BV as the BV derived from the set position; and taking an invalid BV as the BV derived from the set position.

In some embodiments, based on the foregoing solution, a process in which the acquisition unit 1304 derives a BV from at least one set position on the luma sub-block in a set order includes: for any set position on the luma sub-block, deriving, if a target luma block to which a sample point at the set position belongs adopts a non-specified prediction mode, the BV at the set position in one of the following modes, where the specified prediction mode includes one or more of a normal IBC mode, an RRIBC mode, and an IntraTmp mode:

taking a default BV as the BV derived from the set position; and taking an invalid BV as the BV derived from the set position.

In some embodiments, based on the foregoing solution, a process in which the acquisition unit 1304 determines the BV of the luma sub-block based on the derived BV includes:

determining a derived valid BV to be the BV of the luma sub-block.

In some embodiments, based on the foregoing solution, if at least one of the following conditions is met, the derived BV is determined to be a valid BV: a prediction mode adopted by a sample point at the set position is a specified prediction mode, the specified prediction mode including one or more of a normal IBC mode, an RRIBC mode, and an IntraTmp mode; and the derived BV is within a reference range allowed by an IBC mode.

In some embodiments, based on the foregoing solution, the acquisition unit 1304 takes, if no valid BV is derived from at least one set position, the default BV as the BV of the luma sub-block.

In some embodiments, based on the foregoing solution, the acquisition unit 1304 is further configured to: convert, if the BV derived from the set position is an illegal BV, the illegal BV into a valid BV according to a set strategy; and determine the valid BV to be the BV of the luma sub-block; where the set strategy includes converting a BV within a reference range not allowed by an/the IBC mode into a BV in a/the reference range allowed by the IBC mode.

In some embodiments, based on the foregoing solution, the default BV includes at least one of the following:

a valid BV derived from one or more specified positions on the luma block corresponding to the chroma block;

a BV in a history-based BV prediction (HBVP) list;

a BV of a previous luma sub-block;

a BV of another luma sub-block spatially adjacent to a current luma sub-block; and a set BV.

In some embodiments, based on the foregoing solution, the chroma scale factor includes a first scale factor in a horizontal direction and a second scale factor in a vertical direction. The processing unit 1306 is configured to: right-shift a horizontal component of the BV of the luma sub-block according to a value of the first scale factor to obtain a horizontal component of the BV of the chroma sub-block; and right-shift a vertical component of the BV of the luma sub-block according to a value of the second scale factor to obtain a vertical component of the BV of the chroma sub-block.

In some embodiments, based on the foregoing solution, the processing unit 1306 is further configured to: acquire a width and a height of a luma image and a width and a height of a chroma image of the to-be-decoded video; calculate a first ratio of the width of the luma image to the width of the chroma image, and take a logarithm of the first ratio with a base of 2 as the first scale factor; and calculate a second ratio of the height of the luma image to the height of the chroma image, and taking a logarithm of the second ratio with a base of 2 as the second scale factor.

In some embodiments, based on the foregoing solution, the decoding unit 1308 is configured to: generate a predicted sub-block of the at least one chroma sub-block according to the BV of the at least one chroma sub-block; perform chroma sub-block reconstruction processing according to the predicted sub-block of the at least one chroma sub-block to obtain at least one reconstructed chroma sub-block; and generate a corresponding reconstructed block of the chroma block according to the at least one reconstructed chroma sub-block.

In some embodiments, based on the foregoing solution, if the BV of the chroma sub-block is mapped from the BV of the luma sub-block adopting an RRIBC mode, the decoding unit 1308 is further configured to: after a predicted sub-block of the chroma sub-block is generated, flip the generated predicted sub-block according to a flip mode of the luma sub-block adopting the RRIBC mode; or after the chroma sub-block is reconstructed, flip the reconstructed chroma sub-block according to a flip mode of the luma sub-block adopting the RRIBC mode.

Figure 14:
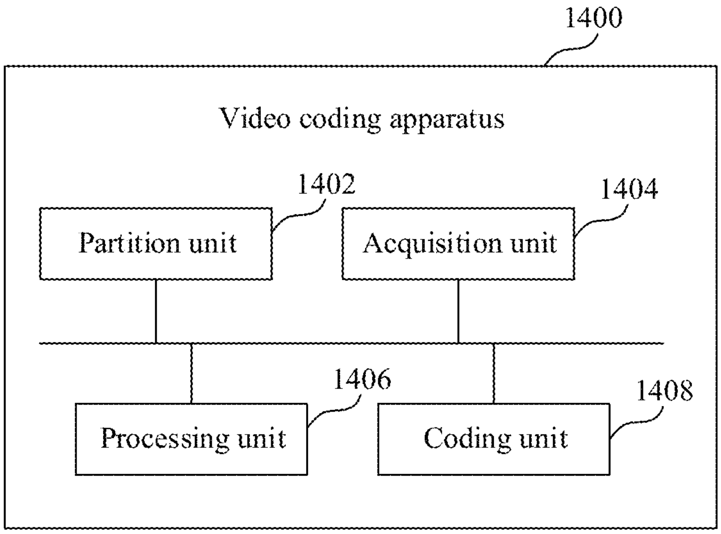
FIG. 14 is a block diagram of a video coding apparatus according to some embodiments.

FIG. 14 is a block diagram of a video coding apparatus according to some embodiments. The video coding apparatus may be disposed in a device with a computing function, such as a terminal device or a server.

Referring to FIG. 14, a video coding apparatus 1400 according to some embodiments includes: a partition unit 1402, an acquisition unit 1404, a processing unit 1406, and a coding unit 1408.

The partition unit 1402 is configured to partition, if it is determined that a BV of a chroma block is derived by means of a BV of a luma block, the chroma block into at least one chroma sub-block. The acquisition unit 1404 is configured to acquire a BV of a luma sub-block corresponding to each of the at least one chroma sub-block. The processing unit 1406 is configured to map the BV of the luma sub-block to a BV of the chroma sub-block according to a chroma scale factor of a to-be-decoded video. The coding unit 1408 is configured to code the chroma block according to the BV of the at least one chroma sub-block.

In some embodiments, based on the foregoing solution, the video coding apparatus further includes: a determination unit configured to determine, if BVs derived from respective sample points included in a to-be-coded chroma block are all valid BVs, a rate distortion cost corresponding to a coding mode in which a BV of the chroma block is derived by means of a BV of a luma block is minimum, that the BV of the chroma block adopting a specified prediction mode is derived by means of the BV of the luma block, the specified prediction mode including a BV-based prediction mode.

According to some embodiments, each module or unit may exist respectively or be combined into one or more units. Some modules or units may be further split into multiple smaller function subunits, thereby implementing the same operations without affecting the technical effects of some embodiments. The modules or units are divided based on logical functions. In application, a function of one module or unit may be realized by multiple modules or units, or functions of multiple modules or units may be realized by one module or unit. In some embodiments, the apparatus may further include other modules or units. In application, these functions may also be realized cooperatively by the other modules or units, and may be realized cooperatively by multiple modules or units.

A person skilled in the art would understand that these “modules” or “units” could be implemented by hardware logic, a processor or processors executing computer software code, or a combination of both. The “modules” or “units” may also be implemented in software stored in a memory of a computer or a non-transitory computer-readable medium, where the instructions of each unit are executable by a processor to thereby cause the processor to perform the respective operations of the corresponding module or unit.

Figure 15:
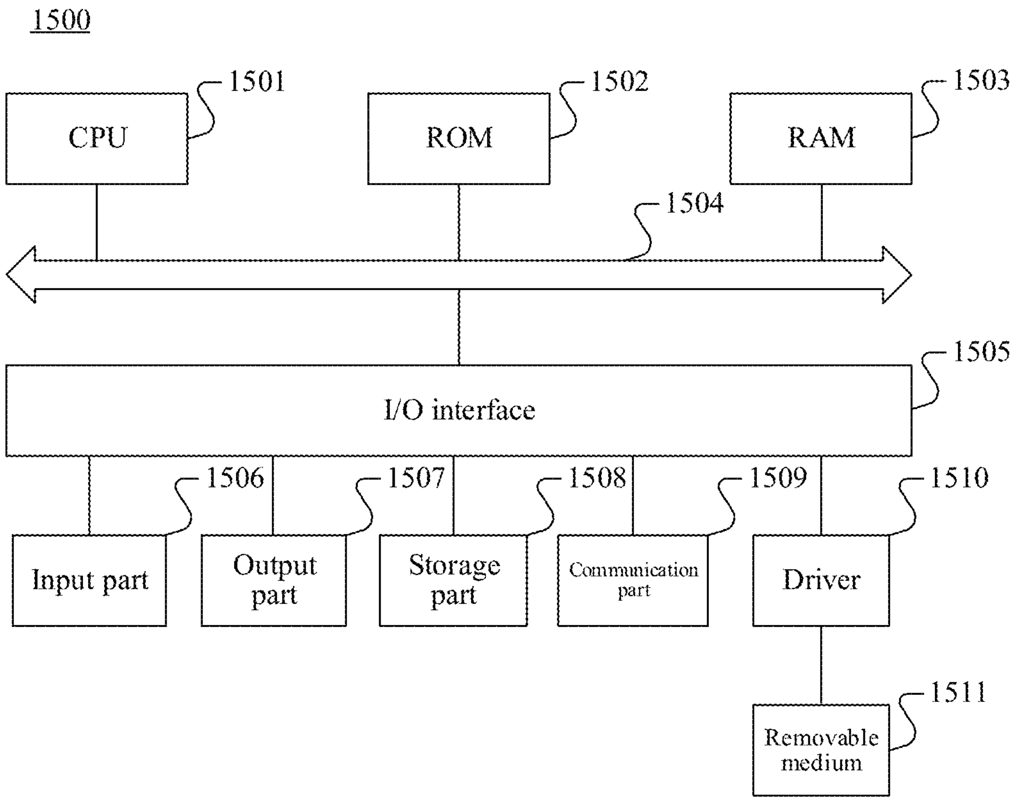
FIG. 15 is a schematic structural diagram of a computer system adapted to implement an electronic device according to some embodiments.

FIG. 15 is a schematic structural diagram of a computer system adapted to implement an electronic device according to some embodiments.

The computer system 1500 of the electronic device shown in FIG. 15 is an example, and does not constitute any limitation on functions and use ranges of some embodiments.

As shown in FIG. 15, the computer system 1500 includes a central processing unit (CPU) 1501, which may perform various actions and processing based on a program stored in a read-only memory (ROM) 1502 or a program loaded from a storage part 1508 into a random access memory (RAM) 1503, for example, perform the method described in some embodiments. The RAM 1503 further stores various programs and data for operating the system. The CPU 1501, the ROM 1502, and the RAM 1503 are connected to each other through a bus 1504. An input/output (I/O) interface 1505 is also connected to the bus 1504.

The following components are connected to the I/O interface 1505: an input part 1506 including a keyboard, a mouse, or the like; an output part 1507 including a cathode ray tube (CRT), a liquid crystal display (LCD), a speaker, or the like; a storage part 1508 including a hard disk, or the like; and a communication part 1509 including a network interface card such as a local area network (LAN) card or a modem. The communication part 1509 performs communication processing by using a network such as the Internet. A driver 1510 may be connected to the I/O interface 1505. A removable medium 1511, such as a magnetic disk, an optical disc, a magneto-optical disk, or a semiconductor memory, may be installed on the drive 1510, so that a computer program read from the removable medium is installed into the storage part 1508.

According to some embodiments, the processes described in the following by referring to the flowcharts may be implemented as computer software programs. For example, some embodiments may be implemented as a computer program product. The computer program product includes a computer program stored in a computer-readable medium. The computer program includes a computer program configured for performing a method shown in the flowchart. In some embodiments, by using the communication part 1509, the computer program may be downloaded and installed from a network, and/or installed from the removable medium 1511. When the computer program is executed by the CPU 1501, the various functions defined in the system in some embodiments are executed.

The computer-readable medium shown in some embodiments may be a computer-readable signal medium or a computer-readable storage medium or any combination of the two. The computer-readable storage medium may be, for example, but is not limited to, an electric, magnetic, optical, electromagnetic, infrared, or semiconductor system, apparatus, or component, or any combination of the above. An example of the computer-readable storage medium may include, but is not limited to, an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In some embodiments, the computer-readable storage medium may be any tangible medium containing or storing a program, and the program may be used by or used in combination with an instruction execution system, an apparatus, or a device. In some embodiments, the computer-readable signal medium may include a data signal transmitted in a baseband or as part of a carrier, and stores a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer program included in the computer-readable medium may be transmitted by using a medium, including, but not limited to, a wireless medium, a wire, or the like, or a combination thereof.

The flowcharts and block diagrams in the accompanying drawings illustrate exemplary system architectures, functions and operations that may be implemented by a system, a method, and a computer program product according to some embodiments. Each box in a flowchart or a block diagram may represent a module, a program segment, or a part of code. The module, the program segment, or the part of code includes one or more executable instructions used for implementing specified logic functions. In some embodiments, functions annotated in boxes may occur in a sequence different from that annotated in an accompanying drawing. For example, actually two boxes shown in succession may be performed in parallel, and sometimes the two boxes may be performed in a reverse sequence. This is determined by a related function. Also, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A computer-readable medium is provided according to some embodiments. The computer-readable medium may be included in the electronic device described in some embodiments, or may exist alone and is not disposed in the electronic device. The computer-readable medium carries one or more computer programs. The one or more computer programs, when executed by the electronic device, cause the electronic device to implement the method described in the foregoing embodiments.

According to the foregoing descriptions of the implementations, a person skilled in the art may readily understand that the exemplary implementations described herein may be implemented by using software, or may be implemented by combining software and hardware. Therefore, the technical solutions of some embodiments may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to some embodiments.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A video decoding method, comprising:

partitioning a chroma block into at least one chroma sub-block based on determining a first block vector (BV) of the chroma block is derived from a second BV of a luma block;

acquiring a third BV of a first luma sub-block corresponding to the at least one chroma sub-block by sequentially deriving a BV from at least one set position on the first luma sub-block in a set order, wherein the acquiring comprises:

based on a valid BV being obtained, using the valid BV as the third BV and terminating the sequential derivation; and based on no valid BV being obtained after sequentially deriving the BV from each of the at least one set position, determining a default BV as the third BV;

mapping the third BV to a fourth BV of the at least one chroma sub-block according to a chroma scale factor of video to be decoded; and decoding the chroma block according to the fourth BV to obtain a reconstructed block corresponding to the chroma block.

2. The video decoding method according to claim 1, wherein the partitioning the chroma block comprises:

determining the first BV is derived from the second BV based on the chroma block adopting a first prediction mode and the chroma block and a corresponding luma block adopting different partition modes, wherein the first prediction mode comprises a BV-based prediction mode.

3. The video decoding method according to claim 2, wherein if the first BV is determined to be derived from the second BV, a first sample point in a first region of the luma block adopts the first prediction mode, and wherein the first region comprises at least one of: an upper-left corner region of the luma block, an upper-right corner region of the luma block, a lower-left corner region of the luma block, a lower-right corner region of the luma block, a central region of the luma block, or a first position in a second luma sub-block corresponding to the at least one chroma sub-block.

4. The video decoding method according to claim 1, wherein the sequentially deriving the BV comprises:

determining as the BV derived from the set position, for a set position in the first luma sub-block, a fifth BV of a target luma block to which a second sample point at the set position belongs based on the target luma block adopting a normal intra block copy (IBC) mode.

5. The video decoding method according to claim 1, wherein the sequentially deriving BV comprises:

deriving, for a set position in the first luma sub-block, based on a target luma block to which a second sample point at the set position belongs adopting a reconstruction-reordered intra block copy (RRIBC) mode, the BV derived from the set position in one of the following modes:

determining a fifth BV of the target luma block as the BV derived from the set position;

determining a default BV as the BV derived from the set position;

determining an invalid BV as the BV derived from the set position; or determining the BV derived from the set position according to first size information and first coordinate information of the first luma sub-block, second size information and second coordinate information of the target luma block, and the fifth BV.

6. The video decoding method according to claim 5, wherein the determining the BV derived from the set position according to the first size information and first coordinate information, the second size information and the second coordinate information, and the fifth BV comprises:

determining a second horizontal component of the BV derived from the set position based on the RRIBC mode being a horizontal flip mode, according to first width information and first horizontal coordinate information of the first luma sub-block, second width information and second horizontal coordinate information of the target luma block, and a first horizontal component of the fifth BV; and determining a first vertical component of the fifth BV as a second vertical component of the BV derived from the set position.

7. The video decoding method according to claim 5, wherein the determining the BV derived from the set position according to the first size information and first coordinate information, the second size information and the second coordinate information, and the fifth BV comprises:

determining a second vertical component of the BV derived from the set position based on the RRIBC mode being a vertical flip mode, according to first height information and first vertical coordinate information of the first luma sub-block, second height information and second vertical coordinate information of the target luma block, and a first vertical component of the fifth BV; and determining a first horizontal component of the fifth BV as a second horizontal component of the BV derived from the set position.

8. The video decoding method according to claim 1, wherein the sequentially deriving the BV comprises:

deriving, for a set position in the first luma sub-block, based on a target luma block to which a second sample point at the set position belongs adopting an intra template matching prediction (IntraTmp) mode, the BV derived from the set position in one of the following modes:

determining a fifth BV of the target luma block as the BV derived from the set position;

determining a default BV as the BV derived from the set position; or determining an invalid BV as the BV derived from the set position.

9. The video decoding method according to claim 1, wherein the sequentially deriving the BV comprises:

deriving, for a set position in the first luma sub-block, based on a target luma block to which a sample point at the set position belongs adopting a non-specified prediction mode, the BV derived from the set position in one of the following modes:

taking a default BV as the BV derived from the set position; and taking an invalid BV as the BV derived from the set position.

10. A video decoding apparatus, comprising:

at least one memory configured to store computer program code; and at least one processor configured to read the program code and operate as instructed by the program code, the program code comprising:

partitioning code configured to cause at least one of the at least one processor to partition a chroma block into at least one chroma sub-block, based on determining a first block vector (BV) of the chroma block is derived from a second BV of a luma block;

acquisition code configured to cause at least one of the at least one processor to acquire a third BV of a first luma sub-block corresponding to the at least one chroma sub-block by sequentially deriving a BV from at least one set position on the first luma sub-block in a set order, wherein the acquiring comprises:

based on a valid BV being obtained, using the valid BV as the third BV and terminating the sequential derivation; and based on no valid BV being obtained after sequentially deriving the BV from each of the at least one set position, determining a default BV as the third BV;

mapping code configured to cause at least one of the at least one processor to map the third BV to a fourth BV of the at least one chroma sub-block according to a chroma scale factor of video; and decoding code configured to cause at least one of the at least one processor to decode the chroma block according to the fourth BV to obtain a reconstructed block corresponding to the chroma block.

11. The video decoding apparatus according to claim 10, wherein the partitioning code is configured to cause at least one of the at least one processor to determine the first BV is derived from the second BV based on the chroma block adopting a first prediction mode and the chroma block and a corresponding luma block adopting different partition modes, wherein the first prediction mode comprises a BV-based prediction mode.

12. The video decoding apparatus according to claim 11, wherein if the first BV is determined to be derived from the second BV, a first sample point in a first region of the luma block adopts the first prediction mode, and wherein the first region comprises at least one of: an upper-left corner region of the luma block, an upper-right corner region of the luma block, a lower-left corner region of the luma block, a lower-right corner region of the luma block, a central region of the luma block, or a first position in a second luma sub-block corresponding to the at least one chroma sub-block.

13. The video decoding apparatus according to claim 10, wherein the acquisition code is configured to cause at least one of the at least one processor to determine as the BV derived from the set position, for a set position in the first luma sub-block, a fifth BV of a target luma block to which a second sample point at the set position belongs based on the target luma block adopting a normal intra block copy (IBC) mode.

14. The video decoding apparatus according to claim 10, wherein the acquisition code is configured to cause at least one of the at least one processor to derive, for a set position in the first luma sub-block, based on a target luma block to which a second sample point at the set position belongs adopting a reconstruction-reordered intra block copy (RRIBC) mode, the BV derived from the set position in one of the following modes:

determine a fifth BV of the target luma block as the BV derived from the set position;

determine a default BV as the BV derived from the set position;

determine an invalid BV as the BV derived from the set position; or

BV derived from the set position according to first size information and first coordinate information of the first luma sub-block, second size information and second coordinate information of the target luma block, and the fifth BV.

15. The video decoding apparatus according to claim 14, wherein the acquisition code is configured to cause at least one of the at least one processor to:

determine a second horizontal component of the BV derived from the set position based on the RRIBC mode being a horizontal flip mode, according to first width information and first horizontal coordinate information of the first luma sub-block, second width information and second horizontal coordinate information of the target luma block, and a first horizontal component of the fifth BV; and determine a first vertical component of the fifth BV as a second vertical component of the BV derived from the set position.

16. The video decoding apparatus according to claim 14, wherein the acquisition code is configured to cause at least one of the at least one processor to:

determine a second vertical component of the BV derived from the set position based on the RRIBC mode being a vertical flip mode, according to first height information and first vertical coordinate information of the first luma sub-block, second height information and second vertical coordinate information of the target luma block, and a first vertical component of the fifth BV; and determine a first horizontal component of the fifth BV as a second horizontal component of the BV derived from the set position.

17. The video decoding apparatus according to claim 10, wherein the acquisition code is configured to cause at least one of the at least one processor to:

derive, for a set position in the first luma sub-block, based on a target luma block to which a second sample point at the set position belongs adopting an intra template matching prediction (IntraTmp) mode, the BV derived from the set position in one of the following modes:

determine a fifth BV of the target luma block as the BV derived from the set position;

determine a default BV as the BV derived from the set position; or determine an invalid BV as the BV derived from the set position.

18. A non-transitory computer-readable storage medium, storing computer code which, when executed by at least one processor, causes the at least one processor to at least:

partition a chroma block into at least one chroma sub-block, based on determining a first block vector (BV) of the chroma block is derived from a second BV of a luma block;

acquire a third BV of a first luma sub-block corresponding to the at least one chroma sub-block by sequentially deriving a BV from at least one set position on the first luma sub-block in a set order, wherein the acquiring comprises:

based on a valid BV being obtained, using the valid BV as the third BV and terminating the sequential derivation; and based on no valid BV being obtained after sequentially deriving the BV from each of the at least one set position, determining a default BV as the third BV;

map the third BV to a fourth BV of the at least one chroma sub-block according to a chroma scale factor of video; and decode the chroma block according to the fourth BV to obtain a reconstructed block corresponding to the chroma block.

* * * * *